United States Patent

Uhlenhaut et al.

[15] 3,707,095
[45] Dec. 26, 1972

[54] SHIFTING LEVER FOR THE TRANSMISSION OF MOTOR VEHICLES

[72] Inventors: Rudolf Uhlenhaut, Stuttgart-Riedenberg; Egon Wieland, Stuttgart-Euerbach; Uwe-Bernd Dittrich, Langmeil-Upper Palatiate, all of Germany

[73] Assignee: Daimler-Benz Aktiengesellschaft, Stuttgart-Unlerlurkheim, Germany

[22] Filed: Jan. 27, 1971

[21] Appl. No.: 110,033

[30] Foreign Application Priority Data

Jan. 29, 1970  Germany.....................P 20 03 874.8

[52] U.S. Cl..............................................74/473 R
[51] Int. Cl....................................................G05g 9/12
[58] Field of Search.........74/473 R, 473 P, 475–477, 74/523

[56] References Cited

UNITED STATES PATENTS 3,410,150  11/1968  Wieland et al. .........................74/476
3,561,281  2/1971  Wilfert....................................74/473

Primary Examiner—Milton Kaufman
Assistant Examiner—Ronald C. Capossela
Attorney—Craig and Antonelli

[57] ABSTRACT

A shifting lever, particularly a center shifting lever, for transmissions of motor vehicles, which is so connected with the shifting linkages leading to the transmission and/or a relatively fixed vehicle part, that the connection releases under the influence of essentially axial pressure forces that are larger than the forces necessary for the shifting of the transmission, whereby the shifting lever, after release of this connection, is displaceable in the axial direction by slight pressure forces or by its own weight.

12 Claims, 3 Drawing Figures

PATENTED DEC 26 1972
3,707,095
FIG. 1
FIG. 2
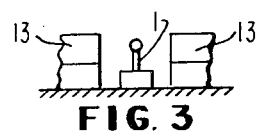
FIG. 3
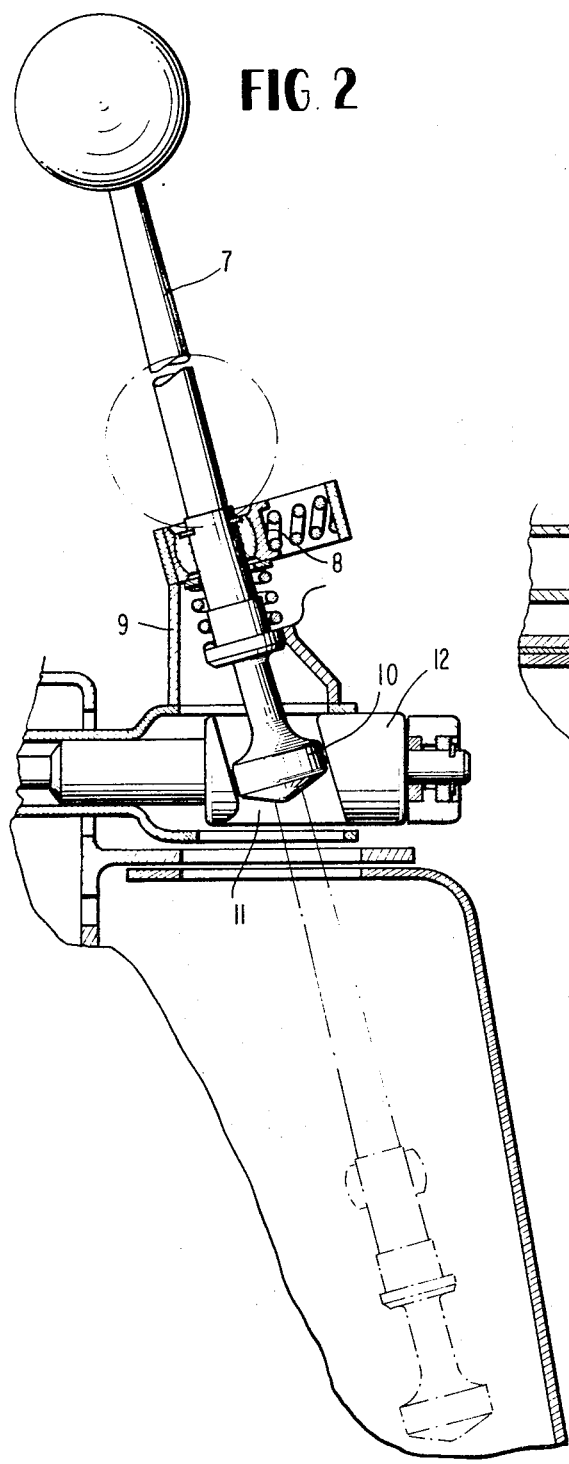
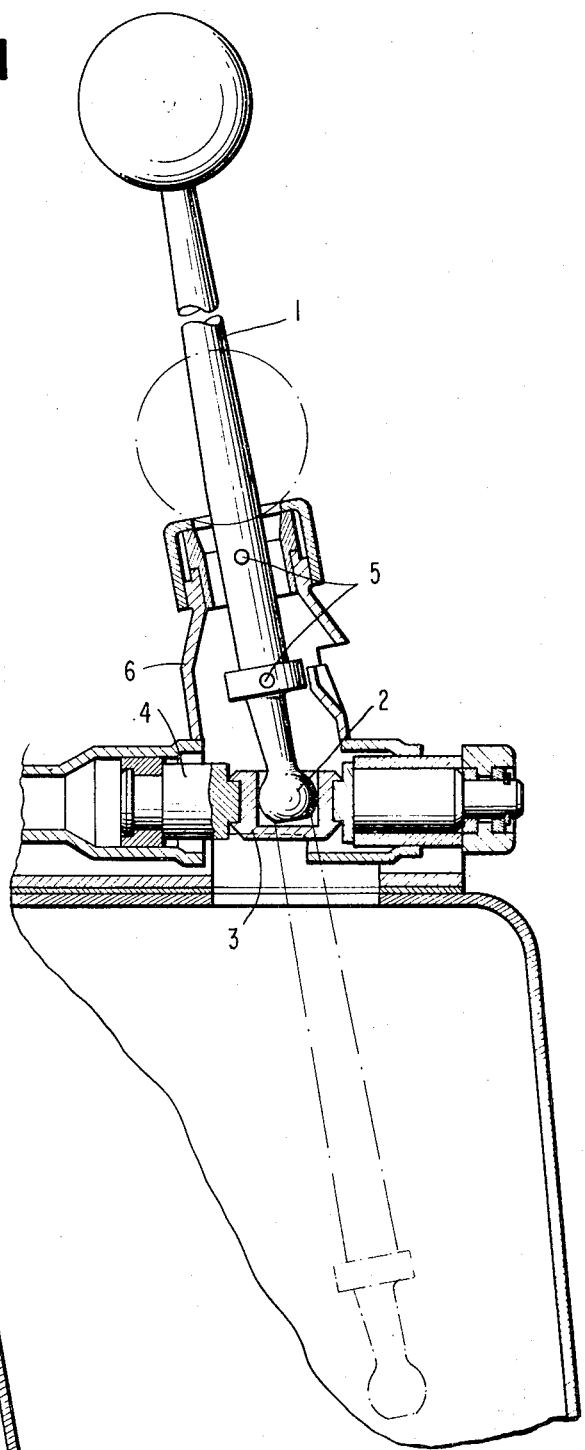
INVENTORS
RUDOLF UHLENHAUT
EGON WIELAND
UWE-BERND DITTRICH
BY Craig, Antonelli, Stewart & Hill
ATTORNEYS

SHIFTING LEVER FOR THE TRANSMISSION OF MOTOR VEHICLES

The present invention relates to a shifting lever, especially a central shifting lever, for the transmission of motor vehicles, which is so constructed that in case of an accident no injury danger for the passengers arises.

It is known that in case of accidents considerable internal injuries of the vehicle passengers may be caused by the customary transmission shifting levers which are non-yielding in the axial direction. Consequently, the present invention is concerned with the task to so construct a shifting lever that this danger is eliminated.

Accordingly, as solution to the underlying problem, a shifting lever, especially a center shifting lever, for the transmission of motor vehicles is proposed which according to the present invention is so connected with the shifting linkage leading to the transmission and/or a fixed vehicle part that the connection is released or becomes disconnected under the influence of essentially axial pressure forces that are larger than the forces necessary for the shifting of the transmission, and in that the shifting lever, after the release of this connection, is displaceable in the axial direction by slight pressure forces or by its own weight.

It is particularly advantageous if the shifting lever terminates at its lower end in a ball in a conventional manner and if this ball is retained in a bearing support which is so secured at an immovable part that this fastening releases under the influence of high axial pressure forces.

Preferably, however, a pot-shaped bearing support is used in connection therewith which consists of an elastic material and is so secured at the shifting tube-guide pin that it disengages itself out of its fastening or mounting under the influence of high axial pressure forces under deformation thereof.

Above the ball, the shifting lever is preferably retained at a shifting lever support by way of shearing pins or a spring-loaded ball locking means, or is also supported at the shifting tube-guide pin within the area of the ball by way of a spring-loaded locking means.

Accordingly, it is an object of the present invention to provide a shifting lever for the transmission of motor vehicles, particularly a central shifting lever, which avoids by simple means the aforementioned shortcomings and drawbacks encountered in the prior art.

Another object of the present invention resides in a shifting lever, particularly a centrally disposed shifting lever, which avoids the danger of internal injury to the vehicle passengers in case of an accident.

A further object of the present invention resides in a shifting lever for the transmission of motor vehicles which is so constructed and arranged as to reliably transmit the shifting movements of the lever to the transmission during normal operation yet is able to yield in case of higher axial pressures.

Still another object of the present invention resides in a shifting lever for the transmission of motor vehicles which is simple in construction, utilizes parts that can be manufactured in a simple and relatively inexpensive manner and is easy to assemble.

Another object of the present invention resides in a shifting lever for the transmission of motor vehicles which can be returned to its normal operating position after an accident so as to provide at least a temporary shifting lever that will engage the various speeds of the transmission.

These and further objects, features and advantages of the present invention will become more obvious from the following description when taken in connection with the accompanying drawing, which shows, for purposes of illustration only, two embodiments in accordance with the present invention, and wherein:

FIG. 1 is a cross-sectional view through a first embodiment of a safety shifting lever in accordance with the present invention;

FIG. 2 is a cross-sectional view through a modified embodiment of a safety shifting lever in accordance with the present invention; and FIG. 3 is a front schematic view showing the lever arrangement between front seats of a vehicle.

Referring now to the drawing, and more particularly to FIG. 1, the shifting lever 1 illustrated in this figure terminates at its lower end in a ball 2 which is supported in a pot-shaped bearing support 3 that is form-lockingly connected with a shifting tube-guide pin 4. The bearing support 3 thereby essentially consists preferably of an elastic material such as rubber or synthetic material, for example, synthetic resinous material. Above the ball 2 the shifting lever 1 is connected with a shifting lever support 6 by way of shearing pins 5 that preferably consist of synthetic material. This connection can take place in such a manner that a certain upward movement of the shifting lever 1 in the axial direction is possible in order, for example, to disengage a locking means for the reverse speed.

With a strong pressure load of the shifting lever 1 in the axial direction, the shearing pins 5 are destroyed, the bearing support 3 disengages itself out of its mounting under deformation and the shifting lever 1 can be displaced into the position indicated in dash and dot lines.

In the embodiment illustrated in FIG. 2, the shifting lever 7 is retained at a shifting lever support 9 by way of a spring-loaded ball locking mechanism 8 and is so guided at its lower end by way of a curved guide surface 10 in a guide means 11 of a shifting tube-guide pin 12 that after the release of the ball locking mechanism 8, the shifting lever 7 can be displaced by an axial load into the position indicated in dash and dot lines.

FIG. 3 schematically shows the lever arrangement between front seats 13.

A further feature and advantage common to both embodiments resides in that the shifting lever, after axial displacement thereof, can be returned again at any time—at least provisionally—into a position ready for operation.

While we have shown and described only two embodiments in accordance with the present invention, it is understood that the same is not limited thereto but is susceptible of numerous changes and modifications as known to those skilled in the art. For example, the shifting lever 1 or 7 may also be retained at the shifting tube-guide pin by way of a spring-loaded locking means. Thus, it is obvious that the present invention is susceptible of numerous changes and modification and we, therefore, do not wish to be limited to the details shown and described herein, but intend to cover all such changes and modifications as are encompassed by the scope of the appended claims.

What we claim is:

1. A shifting lever arrangement for use with transmissions of motor vehicles; said arrangement comprising: a shifting lever having a lever axis extending longitudinally thereof, shifting linkage means operatively engageable with said shifting lever during normal transmission shifting operations, a relatively fixed vehicle part, connecting means located at at least one of said shifting linkage means and said fixed vehicle part for normally holding said shifting lever at an axial position corresponding to normal shifting operation, and force responsive disconnecting means for disconnecting said connecting means in response to axial forces greater than predetermined forces on said shifting lever, said predetermined forces being greater than the axial forces on said shifting lever necessitated by normal shifting operations, said shifting lever being displaceable in the axial direction by one of slight pressure forces and the weight of said shifting lever after disconnection of said connecting means.

2. An arrangement according to claim 1, characterized in that the shifting lever is centrally arranged between front seats of the vehicle.

3. An arrangement according to claim 1, characterized in that the shifting lever is connected with a part transmitting the shifting movement by way of a spring-loaded ball locking means forming part of the disconnecting means.

4. An arrangement according to claim 1, characterized in that the shifting lever is retained at a shifting tube guide pin of the shifting linkage means by way of a spring-loaded locking means forming part of said disconnecting means.

5. An arrangement according to claim 1, characterized in that the shifting lever is connected with a part transmitting the shifting movement by way of shearing pin means forming part of said disconnecting means.

6. An arrangement according to claim 5, characterized in that said last-mentioned part transmitting the shifting movement is a shifting lever support means spaced axially on said shifting lever from said shifting linkage means.

7. An arrangement according to claim 5, characterized in that said shearing pin means consists of a synthetic material.

8. An arrangement according to claim 1, wherein the shifting lever terminates at its lower end in a ball, wherein said connecting means includes bearing support means for retaining said ball, and wherein said force responsive disconnecting means includes means for disconnecting said bearing support means from one of said shifting linkage means and said fixed vehicle part.

9. An arrangement according to claim 8, wherein said bearing support means is of pot-shaped construction and essentially consists of an elastic material, and wherein said bearing support means is so secured at a shifting tube-guide pin means of the shifting linkage means that said bearing support means disengages from the pin means by deformation in response to axial forces on said shifting lever greater than said predetermined forces.

10. An arrangement according to claim 9, characterized in that the shifting lever is connected with a part transmitting the shifting movement by way of shearing pin means.

11. An arrangement according to claim 10, characterized in that said last-mentioned part transmitting the shifting movement is a shifting lever support means spaced axially on said shifting lever from said shifting tube-guide pin means.

12. An arrangement according to claim 11, characterized in that said shearing pin means consists of a synthetic material.

* * * * *